United States Patent [19]

Robison

[11] Patent Number: 5,025,283

[45] Date of Patent: Jun. 18, 1991

[54] MAGNETIC RECORDING ON FILM OF SCENE PARAMETERS AND PHOTOFINISHING PROCESS FOR USE THEREWITH

[75] Inventor: Gary L. Robison, Rochester, N.Y.

[73] Assignee: Eastman Kodak Company, Rochester, N.Y.

[21] Appl. No.: 571,008

[22] Filed: Aug. 23, 1990

Related U.S. Application Data

[63] Continuation of Ser. No. 407,994, Sep. 14, 1989, abandoned.

[51] Int. Cl.⁵ .............................................. G03B 27/52
[52] U.S. Cl. ..................................... 355/40; 354/106; 355/77
[58] Field of Search ....................... 355/40, 77, 41, 68, 355/69; 354/105, 106, 21

[56] References Cited

U.S. PATENT DOCUMENTS

| | | | |
|---|---|---|---|
| 3,718,074 | 2/1973 | Davis | 354/109 |
| 4,001,846 | 1/1977 | Kauneckas | 354/105 |
| 4,182,560 | 1/1980 | Oguchi et al. | 354/106 |
| 4,340,286 | 7/1982 | Carr | 354/105 |
| 4,349,272 | 9/1982 | Holthusen | 355/69 |
| 4,511,229 | 4/1985 | Schwartz et al. | 354/105 X |
| 4,554,591 | 11/1985 | Kee | 358/256 |
| 4,574,319 | 3/1986 | Konishi | 358/335 |
| 4,613,911 | 9/1986 | Ohta | 360/3 |
| 4,782,365 | 11/1988 | Tagaki | 355/38 |
| 4,811,042 | 3/1989 | Cloutier et al. | 354/105 X |
| 4,878,075 | 10/1989 | Cannon | 354/106 X |

FOREIGN PATENT DOCUMENTS

| | | |
|---|---|---|
| 59-162549 | 9/1984 | Japan . |
| 59-201055 | 11/1984 | Japan . |
| 2083652 | 3/1982 | United Kingdom . |
| 2158955 | 11/1985 | United Kingdom . |

OTHER PUBLICATIONS

Eastman Kodak Company, Technical Experience with DataKode Magnetic Control Surface, 1984.
Eastman Kodak Company, Datakode Magnetic Control Surface, 1983.

Primary Examiner—L. T. Hix
Assistant Examiner—Khanh Dang
Attorney, Agent, or Firm—Francis H. Boos, Jr.

[57] ABSTRACT

A camera embodying the invention includes a magnetic recording head adjacent the film and a processor which senses the lens focal length, the aperture size and shutter speed, and the film ISO number or film speed. The processor causes the scene brightness value sensed at the time of exposure of each film frame to be recorded by the magnetic head in a magnetic track adjacent or in registration with the current film frame. The processor senses the aperture size and shutter exposure time acutally employed by the camera in exposing the current film frame to compute an actual exposure value. It then determines whether this actual exposure value deviates significantly from the ideal exposure value and if so by how much. The deviation thus computed, if any, is also recorded in the same magnetic track in the film or one next to it. The photofinishing apparatus searches a particular one of the magnetic tracks adjacent each film frame prior to its print exposure to determine the deviation between the ideal exposure value (computed from the recorded scene brightness value and film speed) and the actual exposure value (computed from the recorded aperture size and shutter speed actually employed by the camera in exposing the film frame). The photofinishing apparatus transmits this deviation to a print exposure controller, which changes the amount of light (exposure value) used to expose print paper to the current film frame so as to compensate for the deviation.

6 Claims, 4 Drawing Sheets

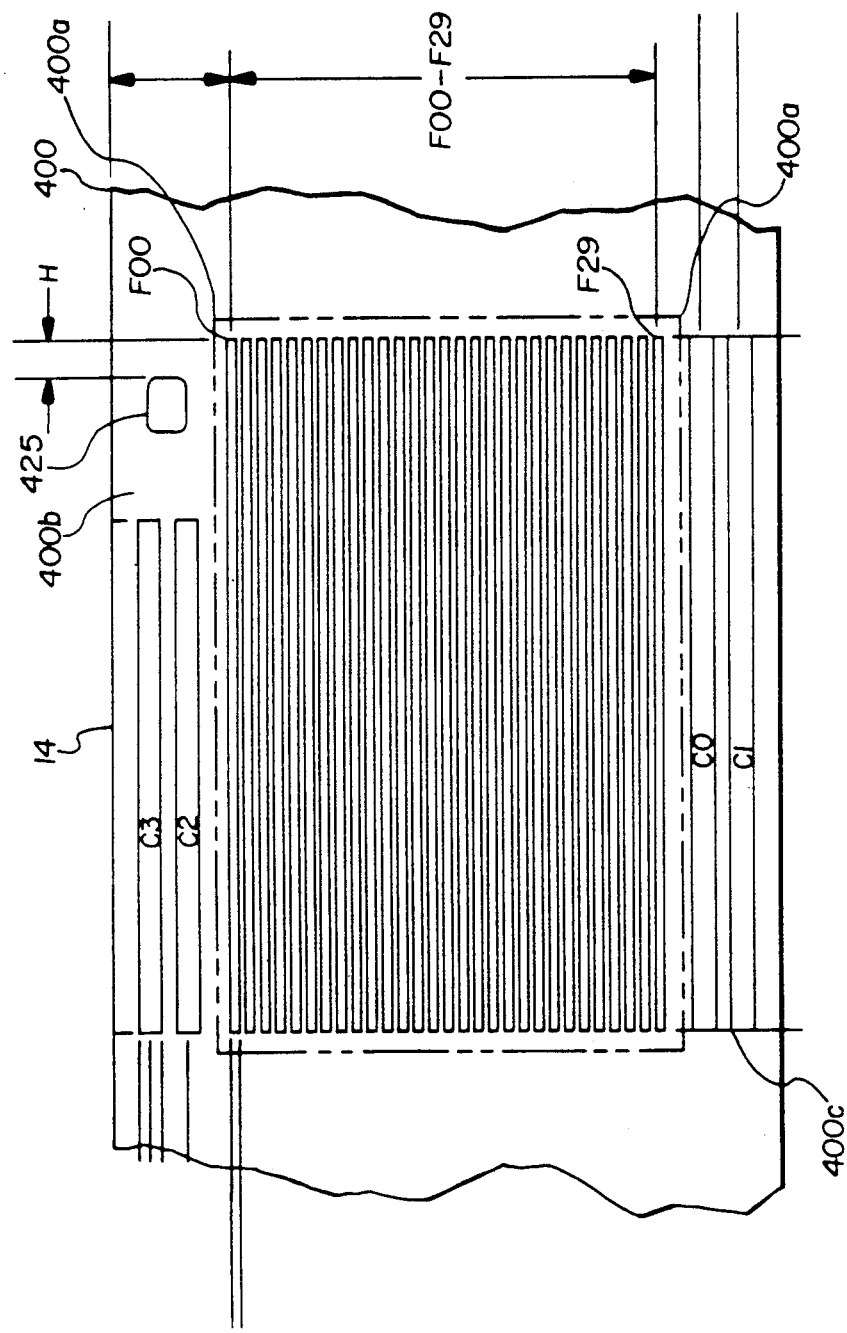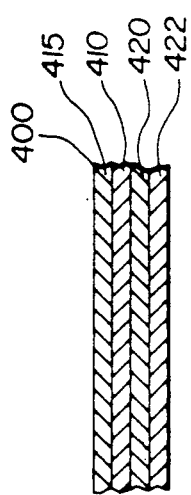

MAGNETIC RECORDING ON FILM OF SCENE PARAMETERS AND PHOTOFINISHING PROCESS FOR USE THEREWITH

This application is a continuation of application Ser. No. 07/407,994, filed Sept. 4, 1989, abandoned.

TECHNICAL FIELD

The invention is related to magnetic recording of scene-related parameters on film.

BACKGROUND OF THE INVENTION

The ideal or nominal amount of light or exposure value for exposing a frame of film is specified by the speed, or ISO number, of the film. The camera (or photographer) determines from the ISO number of the film and from the brightness of the scene about to be photographed how much of the scene illumination to admit through the camera shutter onto the film to obtain the ideal exposure. Either the camera's aperture size or shutter exposure time or both must be adjusted to admit just the right amount of light onto the film. The amount of light is increased by increasing either the exposure time or the aperture size or both and is decreased by doing the opposite.

If the camera (or photographer) commits an error in determining the correct shutter exposure time and aperture size used to expose color negative film frame, the negative image on the film is either slightly washed out and of low contrast (in the case of underexposure) or has insufficient contrast between different objects in the image (in the case of an overexposure). The effect is sometimes unavoidable, particularly in cases of high speed photography wherein the shutter exposure time must be extremely short. If the photofinisher is aware of such an error, he can at least partially compensate by changing the amount of light used to expose the film image onto print paper. For example, an underexposed (thin) film negative image should be printed with a less print exposure than normal. The problem is that, absent a skilled photofinishing operator or a sophisticated film image scanner such as those used in the Eastman Kodak Company CLAS 35 film printer, the photofinisher will not necessarily know that a particular film frame has been over- or underexposed.

A more severe problem is that the unusual darkness or lightness of a developed film image is not necessarily an indication of a camera exposure error because the actual scene luminance may have been abnormally dark or light, due to the objects in the scene being unusually light or dark.

In the prior art it has been at least suggested that various scene parameters be recorded on film. Specifically, exposure conditions have been suggested as being recorded optically on the film. The disadvantage here is that such information is not available until after the film is developed. Moreover, the information may not be supplemented, since it must be carefully optically recorded on the film using special exposure devices such as those found in some of the higher quality automatic cameras.

While it has been suggested to record various scene parameters such as shutter speed and aperture size adjacent each frame on the film, it has not been suggested how to make such information meaningful to a photofinisher, since such information only has an absolute meaning if one knows the brightness of the scene and the capabilities of the camera.

SUMMARY OF THE INVENTION

The invention uses film having a virtually transparent magnetic layer in which information pertaining to a particular film frame may be recorded on the film adjacent that frame. A camera embodying the invention includes a magnetic recording head adjacent the film and a processor which senses the lens focal length, the aperture size and shutter speed, and the film ISO number or film speed. The processor causes the scene brightness value sensed at the time of exposure of each film frame to be recorded by the magnetic head in a magnetic track adjacent or in registration with the current film frame. Other information may also be recorded therein including the camera aperture size and shutter speed used to expose the frame. In one embodiment of the invention, if the processor determines that the ideal exposure value for the particular scene brightness does fall within the exposure value range of the camera, then the processor senses the aperture size and shutter exposure time actually employed by the camera in exposing the current film frame to compute an actual exposure value. It then determines whether this actual exposure value deviates significantly from the ideal exposure value and if so by how much. The deviation thus computed, if any, is also recorded in the same magnetic track in the film or one next to it. The coded data representing such information generated by the processor is temporarily stored and then recorded by the head as the film is wound to the next film frame following the exposure.

As a result, a plurality of magnetic tracks parallel with the length of the film dedicated respectively to the recording of different information for each film frame may be created by the head or heads employed in a camera of the invention. The lengthwise registration of the magnetic tracks containing information pertaining to a particular film frame with that frame unambiguously identifies such information with the appropriate film frame.

The photofinishing apparatus of the invention includes an exposure source for exposing each frame of the film onto photosensitive print paper. It further includes a magnetic playback head and playback circuits connected to a processor controlling the print exposure source as well as a film advance motor and print paper advance motor controlling the position of both the film and the print paper for the printing of successive frames in the film. The photofinishing apparatus searches a particular one of the magnetic tracks adjacent each film frame prior to its print exposure to determine the deviation between the ideal exposure value (computed from the recorded scene brightness value and film speed) and the actual exposure value (computed from the recorded aperture size and shutter speed actually employed by the camera in exposing the film frame). The photofinishing apparatus transmits this deviation to a print exposure controller, which changes the amount of light (exposure value) used to expose print paper to the current film frame so as to compensate for the deviation. In the preferred embodiment, the photofinishing apparatus computes this deviation using the film speed, the scene brightness value, the aperture size and shutter speed magnetically recorded in or adjacent the current film frame. In another embodiment of the invention, the deviation is pre-computed in the camera and recorded on the film for use by the photofinishing apparatus.

DESCRIPTION OF THE DRAWINGS

The invention is best understood by reference to the accompanying drawings, of which:

FIG. 4 is a plan view of the parallel magnetic tracks in film employed in the camera of FIG. 1 and the photofinishing apparatus of FIG. 3; and FIG. 5 is a cross-sectional view of the film of FIG. 4.

DETAILED DESCRIPTION

Figure 1:
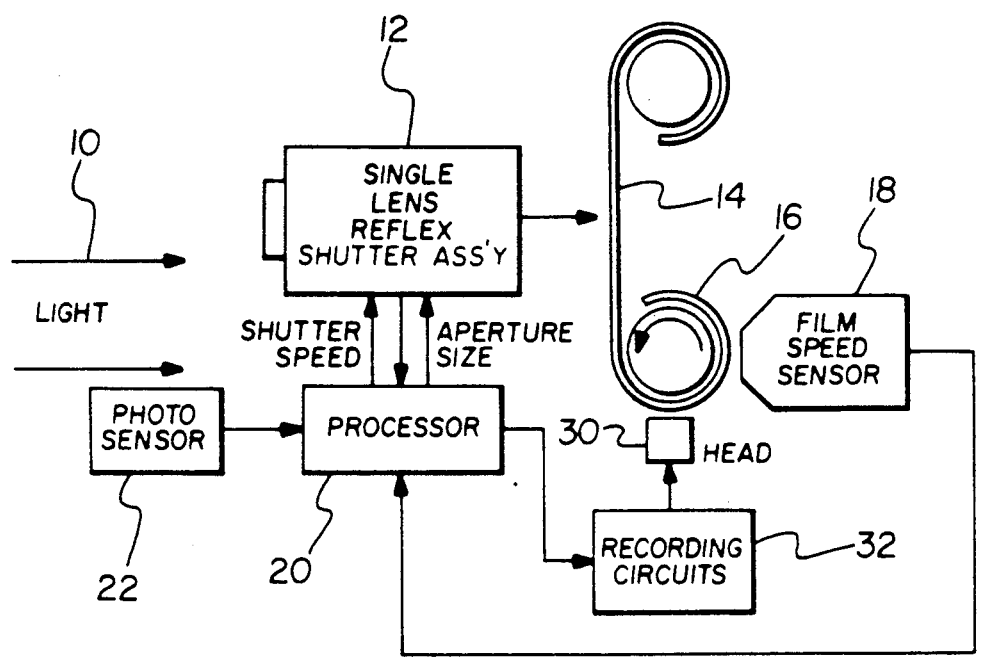
FIG. 1 is a simplified schematic block diagram illustrating a camera embodying one aspect of the invention.

Referring to FIG. 1, light 10 reflected from a scene to be photographed enters a single lens reflex (SLR) shutter assembly 12. The SLR shutter assembly 12 regulates the amount of the light 10 which reaches a strip of film 14 wrapped around a take-up reel 16. For this purpose, the SLR shutter assembly admits light through an aperture characterized by a certain size, the aperture being open for a particular exposure time, the exposure time and aperture size together with the lens focal length determining the exposure value or amount of light reaching the film 14. The take-up reel 16 then rotates to bring the next frame of the film 14 into registration with the SLR shutter assembly 12 in preparation for the next exposure. A film speed sensor 18, using well-known techniques such as DX coding on the film cartridge, senses the film speed or ISO number of the film strip 14 and transmits this information to a processor 20. The processor 20 also receives a signal from a photosensor 22 representing the brightness of the light 10. The processor 20 determines the exposure time and aperture size for exposing the next frame of film from the scene brightness value received from the photosensor 22 and the film speed or ISO number received from the film speed sensor 18, using techniques well-known in the art. The processor 20 then transmits the exposure time and aperture size thus determined as servo commands to the SLR shutter assembly.

In the invention, the film 14 includes, as one of its layers, a virtually transparent magnetic material in which data may be magnetically recorded. To take advantage of this feature, the camera of FIG. 1 further includes a magnetic recording head 30 controlled by recording circuits 32. The processor 20 transmits data to the recording circuits 32 for recording on the film 14 through the head 30. In accordance with the invention, the processor 20 includes means for generating information upon which a photofinisher may rely in determining how to proceed in the development or printing of a particular one of the frames exposed on the film 14.

Referring to FIG. 1, the processor 20 is furnished with information characterizing the SLR shutter assembly 12, including the lens focal length F. Furthermore, the processor 20 receives signals representing the actual aperture size D as well as the actual shutter time T employed by the SLR shutter assembly 12 in exposing a current frame of the film 14. In addition, as described above in connection with FIG. 1, the processor 20 receives the film ISO number from the film speed sensor 18 and the scene brightness value from the photosensor 20. The processor 20 causes all these values to be recorded in a magnetic track in the film adjacent the current frame. The processor 20 transmits the foregoing information as encoded data to recording circuits 32 as the film 14 is wound on the take-up reel 16 to the next frame thereof so that the head 30 records this information in a magnetic track (or tracks) adjacent the current film frame in the magnetic layer.

Figure 2:
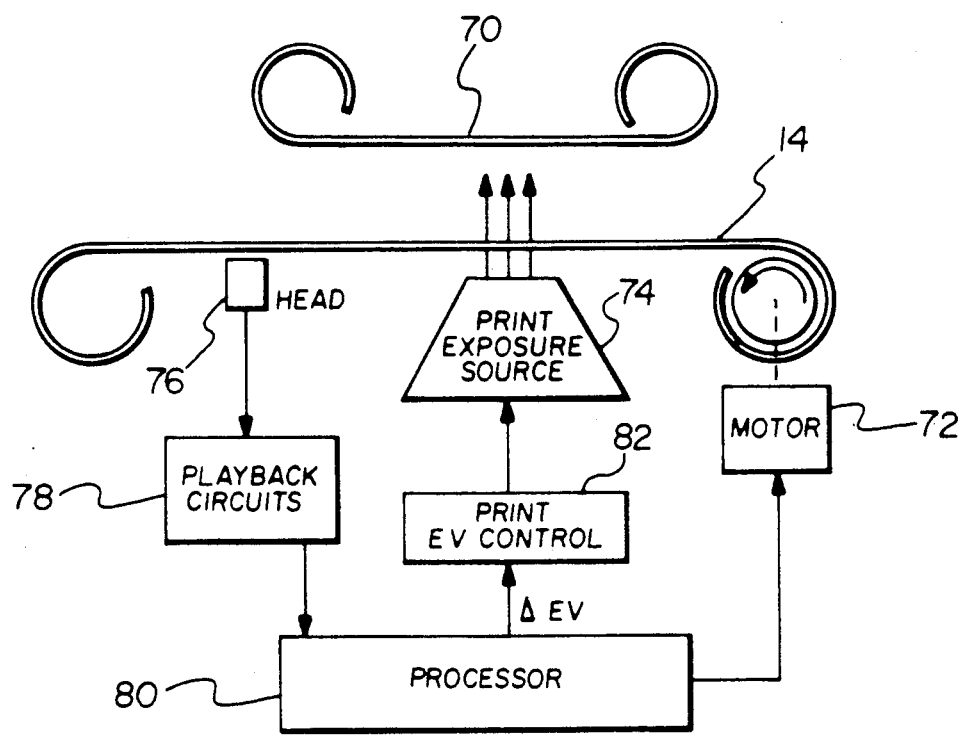
FIG. 2 is a simplified schematic block diagram of photofinishing apparatus embodying another aspect of the invention.

Referring to FIG. 2, a photofinishing system embodying the invention processes the film 14 exposed by the camera of FIG. 1 and a strip of photosensitive printing paper 70 using a film advance motor 72, a print exposure light source 74, a magnetic playback head 76 and playback circuits 78 connected thereto. The photofinishing system of FIG. 3 also includes a processor 80. As each frame on the film strip 14 is advanced past the magnetic playback head 76 in preparation for being exposed to the print exposure source 74, the processor decodes the signal received from the head 76 through the playback circuits 78 in order to read the recorded scene brightness value, the actual shutter exposure time and the actual aperture size. It may also read the camera lens focal length and the film speed (ISO number) if these were also recorded on the film.

In the following discussion, the actual exposure value (sometimes abbreviated EV) is the amount of light to which a film frame (or print paper frame) is exposed and is defined as the base two logarithm of the square of the lens focal length divided by the product of the exposure time and the square of the aperture size. The ideal exposure value is defined as the base two logarithm of the product of the film ISO number, a scale factor and the scene brightness. The scale factor depends upon the units in which the scene brightness is measured. This latter definition defines the ideal exposure value or amount of light which the film ought to receive for a nominal exposure for ideal contrast and image quality. Any difference between the actual exposure value (computed from the shutter speed and aperture size selected by the camera) and the ideal exposure value (computed from the scene brightness and the film speed or ISO number) is measured by the photofinishing system processor of FIG. 3 and used to change the print exposure from a nominal value so as to compensate for the difference.

The processor 80 computes the ideal exposure value from the scene brightness value magnetically read from the film near the film frame about to be printed.

Figure 3:
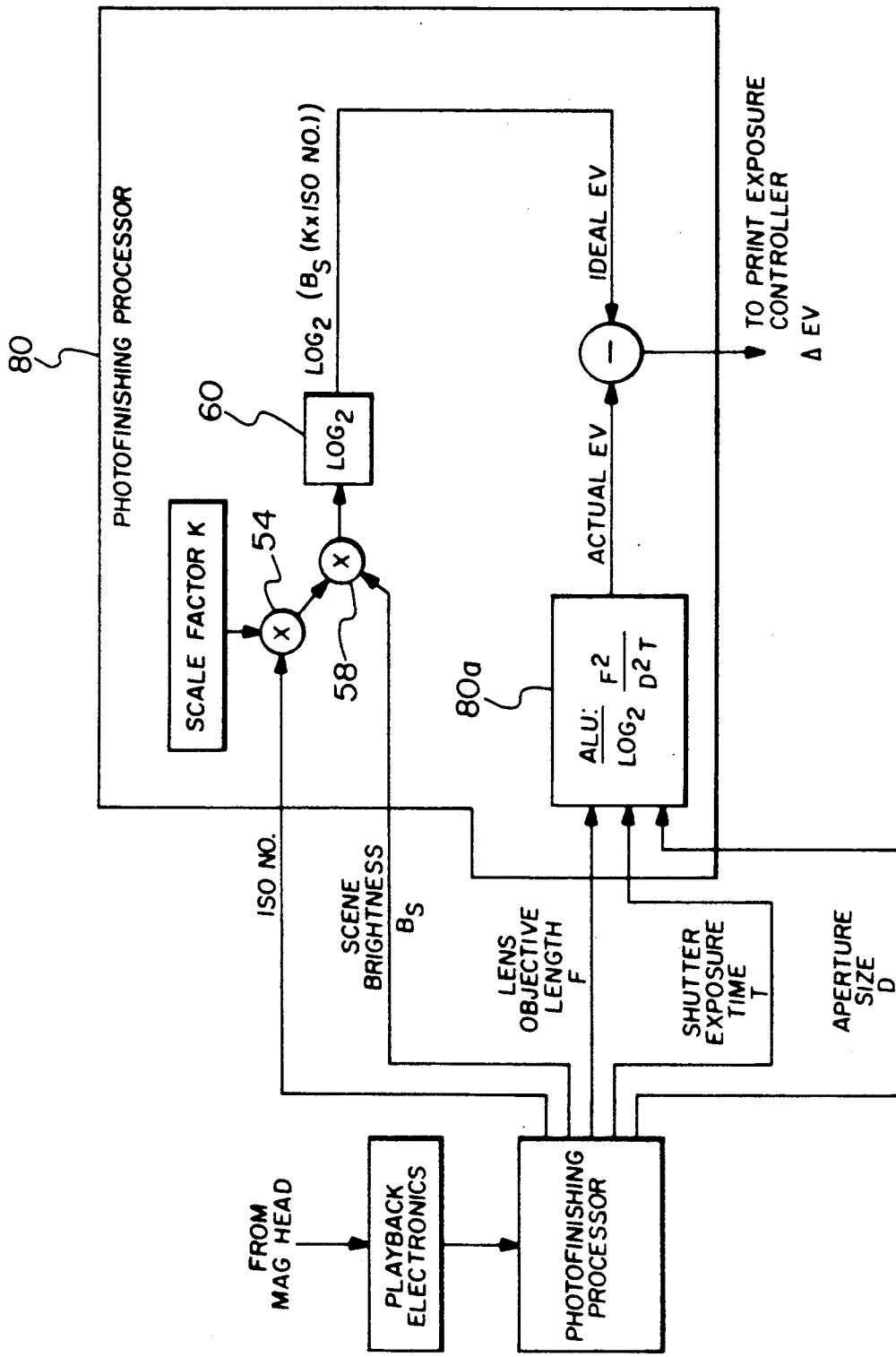
FIG. 3 is a functional block diagram illustrating a processor in the photofinishing apparatus of FIG. 2.

As indicated in the top of FIG. 3, the ISO number of the film is multiplied in a multiplier 54 by a scale factor K. (In accordance with well-known techniques, the scale factor K depends upon the units in which the film speed is specified and the units in which the scene brightness was measured.) The brightness value is multiplied in a multiplier 58 by the product computed by the multiplier 54. Arithmetic logic unit (ALU) 60 then computes the base two logarithm of the product produced by the multiplier 58, the result being the ideal exposure value with which the film should have been exposed. The processor 80 receives the actual aperture size D and the actual shutter time T (which the SLR shutter assembly employed in exposing the current film frame) from the magnetic head 76 through the playback electronics 78. The ALU 80$a$, as indicated in FIG. 3, computes the actual exposure value from the actual aperture size D and actual shutter time T employed by the camera of FIG. 1 and stores the actual exposure value in a buffer (not shown) associated with ALU 60.

The value stored in the buffer is the base two logarithm of the square of the lens focal length divided by the product of the actual shutter time and the square of the actual aperture size. The comparator 64 subtracts the actual exposure value stored in the buffer from the ideal exposure value stored in the buffer (not shown) associated with ALU 60 to determine the exposure value deviation Δ. The photofinishing processor 80 transmits the magnitude and direction of the deviation Δ (between the actual exposure value and the ideal exposure value) to the print exposure controller 82 just as the current frame on the film 14 is transported past the head 76 in preparation for being exposed by the print exposure source 74. The print exposure controller 74 changes or adjusts the exposure value with which the print exposure source 74 exposes the print paper 70 from a nominal exposure value by an amount equal to (or proportional to) the magnitude of the exposure deviation Δ but by an opposite polarity. Thus, for a negative Δ (underexposed film), the print is exposed to less than the nominal amount of light, for example. Such an adjustment at least partially compensates for the error in the camera exposure value.

One way of making such an adjustment is to select a nominal print exposure value $EV_0$ which is known to produce a gray level or pixel density in the print paper lying in the middle of the density range of the print paper, and simply add Δ to $EV_0$ to obtain the desired print exposure value.

Referring to FIG. 4, the magnetic head 30 in the camera of FIG. 1 records data encoded by the camera processor 20 representing the scene brightness value, the shutter time and the aperture value for each film frame in predetermined ones of plural magnetic tracks C0–C3 or F00–F29 extending parallel with the length of the film 400 adjacent or within the frame 400a. In a preferred embodiment, the tracks C0–C3 would be employed for such recording, because these tracks lie outside of the image frame area 400a on the film 400. The advantage of such a choice is that the magnetic head 30 may be narrow enough so as to lie or contact only the peripheral film regions 400b, 400c, and thereby avoid the image frame area 400a. As shown in FIG. 5, film 400 typically includes a base 410, various well known photo-chemical layers 415 on one side of the base, and a virtually transparent magnetic layer 420 on the other side. An anti-static and lubrication layer 422 can overlie the magnetic layer 420. In one aspect of the invention, different ones of the plural tracks in FIG. 4 are dedicated to recording different types of information. Thus, the scene brightness value is always recorded in a particular one of the tracks C0–C3, so that the photofinishing apparatus may readily find it as it processes each frame while shutter speed, aperture size and other parameters are recorded in other tracks or in the same track. In another aspect of the invention, each of the tracks illustrated in FIG. 4 starts and stops within the length of the image frame 400a. In this way, the information magnetically recorded in connection with that frame is unambiguously associated with that frame by its location in the magnetic tracks adjacent that frame. In this aspect, the film 400, in addition to storing the photographic image, also functions in the manner of an X-Y addressable random access memory in which each frame is addressed by moving the film along the X direction, while the particular information type to be monitored is addressed by searching for the corresponding one of the parallel tracks in the Y direction.

Thus, the photofinisher system need do very little searching to monitor all frames on the film 400 without interrupting the printing process to any significant degree.

While the invention has been described in detail with reference to a preferred embodiment thereof, it is understood that variations and modifications thereof may be made without departing from the true spirit and scope of the invention.

What is claimed is:

1. In photofinishing apparatus which processes a strip of developed film having a virtually transparent magnetic layer therein and a strip of photosensitive print paper, said photofinishing apparatus comprising a print exposure source for exposing individual frames on said film onto individual frames on said print paper and a print exposure value controller for controlling the amount of light with which said print exposure source exposes an individual frame of said film onto an individual frame on said print paper, the improvement comprising:

magnetic head means for sensing data previously recorded in magnetic tracks in said film magnetic layer; and a processor, including means for:

a. sensing film speed value, scene brightness value and actual exposure value characterizing the exposure of an individual one of said film frames from said data, b. computing from said scene brightness value and from said film speed value an ideal exposure value, c. determining the difference between said actual exposure value and said ideal exposure value, and d. commanding said print exposure value controller to employ a print exposure value corresponding to a nominal print exposure value modified by an amount corresponding to said difference, so as to compensate for said difference in exposing said print, whereby said print is characterized by a higher image quality than would otherwise be achieved using another print exposure value.

2. The improvement of claim 1 wherein said means for determining said actual exposure value comprise means for reading out through said magnetic head means the actual shutter exposure time and aperture size previously recorded in a magnetic track adjacent said film frame at the time of exposure of said frame, and computing therefrom said actual exposure value.

3. The improvement of claim 2 wherein said magnetic tracks comprise plural parallel tracks in registration with respective ones of said film frames, wherein for each one of said frames, said scene brightness value, said shutter exposure time and said aperture size is each recorded in a predetermined respective one of said tracks.

4. The improvement of claim 1 wherein said means for determining said actual exposure value comprise means for reading out through said magnetic head means an actual exposure value previously recorded on said film.

5. The improvement of claim 1 wherein said nominal print exposure value corresponds to a medium pixel density in said print paper, and wherein said print exposure value equals the sum of said nominal print exposure value and said difference.

6. In a photofinishing apparatus wherein previously developed film having a virtually transparent magnetic layer therein is exposed onto photosensitive print paper with a print exposure source, the improvement comprising:

magnetic head means for playing back data previously recorded in magnetic tracks on said film in registration with individual frames thereof;

print exposure value control means for varying the exposure value employed by said print exposure source in exposing a frame on said print paper to said frame on said film; and a processor, including means for:
  a. reading through said magnetic head means data previously recorded on said magnetic tracks representing a difference between an ideal exposure value and an actual exposure value characteristic of said film frame, and
  b. transmitting said difference to said print exposure value controller, whereby said controller changes the exposure value employed by said print exposure source so as to compensate for said difference in making a print from said film frame.

* * * * *